March 10, 1970     R. BISHOP     3,500,283
ELECTRIC WELDING
Filed June 12, 1967
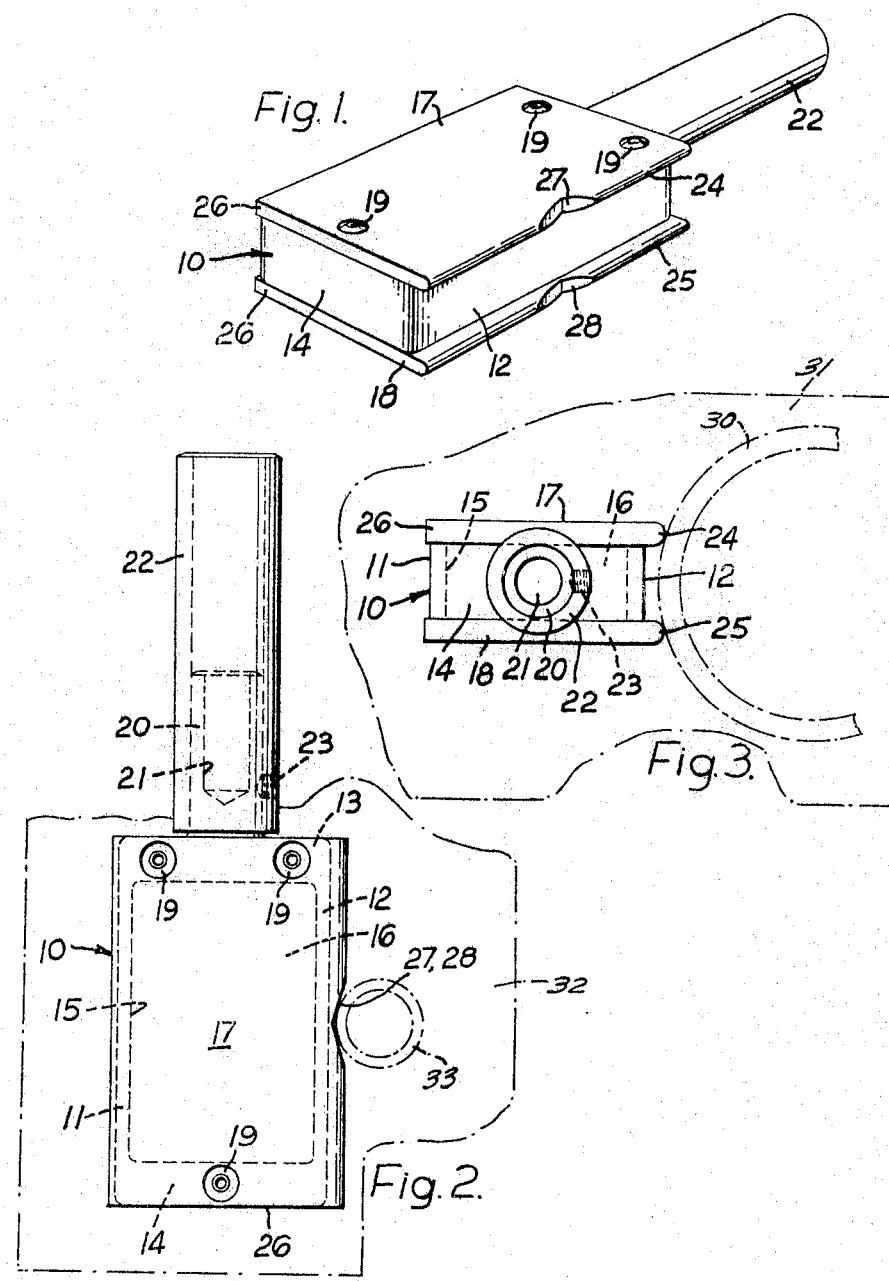
INVENTOR
RONALD BISHOP 3,500,283
ELECTRIC WELDING
Ronald Bishop, Alrewas, England, assignor to Bisbell Engineering Limited, Lichfield, England, a British company
Filed June 12, 1967, Ser. No. 645,220
Claims priority, application Great Britain, June 21, 1966, 27,669/66
Int. Cl. H01r 11/30
U.S. Cl. 339—12
9 Claims

ABSTRACT OF THE DISCLOSURE

An earth return connector for electric welding comprises a ferro-magnetic body that is adapted to engage and position a ferro-magnetic part to be welded, an earth return line connection to the body, and a permanent magnet of anisotropic electrically non-conductive ferrite material contained within said body.

---

This invention relates to electric welding.

In electric welding, it is common practice to connect an article to be welded to an earthed cable to permit passage of an electric current through the article during welding. It is known to use "crocodile clips" as connectors for this purpose, but these have the disadvantages that the size of article with which a particular clip can be used is limited.

According to the invention a connector for use in electric welding comprises a body for engagement with a ferro-magnetic article to be welded, means for connecting the body to an earth line whereby the article may be electrically connected to earth and magnet means carried by the body to cause the latter to be attached to the article.

The magnet is preferably formed of an anisotropic, non-conductive, ferrite material. Alternatively, however, the magnet may be formed of a ferro-magnetic material and be electrically isolated from the body.

Advantageously, the body is suitably adapted to serve as a jig for locating articles to be welded.

For this purpose the body can include jig plates arranged to contact opposite sides of the magnet and having corresponding edges which provide spaced abutments for locating an article in a plane parallel to the planes of the plates.

The invention also provides jig plates for attachment to a connector which includes a magnet for causing the connector to be attached to a ferro-magnetic article to be welded.

A particular embodiment of the invention is described in detail, by way of example, with reference to the accompanying drawings, in which:

FIGURE 1 is a perspective view of a connector constructed in accordance with the invention;

FIGURE 2 is a side elevation of the connector shown in FIGURE 1; and

FIGURE 3 is an end elevation thereof.

Referring to the drawings, the connector comprises a body 10 in the form of a rectangular frame formed of brass or aluminum and which has parallel side walls 11 and 12 and parallel end walls 13 and 14 which define a central opening 15. A magnet 16 formed of an anisotropic, non-conductive, ferrite material is accommodated in the opening 15 and the linear dimensions of the magnet are such that the magnet is a close fit between the walls 11 to 14 of the body 10 whilst its thickness corresponds to the height of said walls.

The body 10 is provided with rectangular plates 17 and 18 formed of a ferro-magnetic material such as mild steel. The plates are located so that each plate contacts one side of the magnet and the adjacent edges of the side walls 11 to 14. Rivets 19 pass through the plates and through the end walls 13 and 14 of the body and serve to secure the plates in position.

A boss 20, integral with the body 10, projects from the end wall 13 and is formed with a blind axial bore 21 for receiving one end of the core of an earth cable (not shown). A tube 22 formed of an insulating material has a part of its length sleeved over the boss 20 and is secured thereon by a grub screw 23 to serve as a handle for the connector.

In use, the connector is placed into contact with an article to be welded, adjacent to the region where the article is to be welded, so that the edges on the side of one of the plates 17, 18 are in contact therewith. The magnetic field causes the connector to be attached firmly to the article so that the latter is electrically connected to earth through the body and cable.

The connector is also adapted to serve as a jig whereby two articles to be welded together may be located relative to one another before the welding operation. For this purpose, the plates 17 and 18 have corresponding rounded edges 24 and 25 which project beyond the outer surface of the side wall 12 of the body 10 to provide spaced abutments for locating an article, such as a tube 30, as shown in chain-dotted lines in FIGURE 3. The edges 26 of the plates 17 and 18 which are parallel to the end wall 14 of the body 10 are placed into contact with a first article 31 to be welded and at a definite location thereon. A tube to be welded to the first article is then arranged with its axis parallel to the planes of the plates 17 and 18 and is then brought into contact with the edges 24 and 25 thereof, so that it is located in the desired position.

It will be understood that tubes of various diameters may be located in this manner provided that the diameter of each tube is large enough to allow the tube to contact both of the edges 24 and 25. In order to locate tubes of small diameters which cannot be located by contact with the edges 24 and 25, use is made of aligned notches 27 and 28 which are formed in the edges 24 and 25 respectively. In locating such small diameter tubes, the connector is attached to a first article 32 to be welded by placing the outer surface of the plate 17 or 18 into contact therewith. A tube 33 is then located with its longitudinal axis at right angles to the plane of the plates 17 and 18 by location in the notches 27 and 28, as shown in chain-dotted lines in FIGURE 2.

It will be appreciated that the invention provides a connector which can be attached to articles to be welded of widely varying sizes and which will also serve efficiently as a jig for locating articles of widely varying sizes to be welded together.

I claim:

1. An earth return connector for use in electric welding comprising a ferromagnetic body for engagement with a ferro-magnetic part to be welded, means for connecting the body to an earth return line, and a magnet contained within the body to cause the latter to be magnetically attached to said ferro-magnetic part characterised in that the magnet is formed of an anisotropic electrically non-conductive ferrite material.

2. An earth return connector according to claim 1 wherein the body comprises a pair of ferro-magnetic plates sandwiching the magnet therebetween.

3. An earth return connector according to claim 2 wherein the body comprises as non-magnetic frame surrounding the magnet between the ferro-magnetic plates.

4. An earth return connector according to claim 1 wherein the body comprises a pair of ferro-magnetic plates which sandwich the magnet therebetween, and a non-magnetic frame surrounding the magnet between the ferro-magnetic plates, said plates having a corresponding pair of edges which project beyond the frame.

5. An earth return connector according to claim 4 wherein corresponding edges are rectilinear and parallel.

6. An earth return connector according to claim 4 wherein said corresponding edges have respective and transversely aligned notches.

7. An earth return connector according to claim 4 wherein said plates have respective rectilinear edges adjoining said projecting edges at right angles.

8. An earth return connector according to claim 4 wherein said plates are rectilinear.

9. An earth return connector according to claim 4 wherein rivets connect the plates together through the frame.

References Cited

UNITED STATES PATENTS

| | | | |
|---|---|---|---|
| 3,126,617 | 3/1964 | Blume | 335—302 XR |
| 1,956,840 | 5/1934 | Walmsley | 219—158 |
| 2,204,396 | 6/1940 | Barnes et al. | |
| 2,489,475 | 11/1949 | Blind. | |
| 2,706,762 | 4/1955 | Alexander et al. | |
| 2,828,472 | 3/1958 | Wondriska. | |

FOREIGN PATENTS 540,690  10/1941  Great Britain.

OTHER REFERENCES

Wireless World, December 1960, pp. 595 through 598, Ceramic Permanent Magnets, Bunn et al.

Phillips Technical Review, vol. 13, January 1952, pp. 194 to 197.

RICHARD E. MOORE, Primary Examiner

PATRICK A. CLIFFORD, Assistant Examiner

U.S. Cl. X.R.

219—158; 335—302